United States Patent
Yamauchi et al.

(10) Patent No.: US 10,632,991 B2
(45) Date of Patent: Apr. 28, 2020

(54) VEHICLE WITH CAPACITOR DISCHARGE CONTROL

(71) Applicant: TOYOTA JIDOSHA KABUSHIKI KAISHA, Toyota-shi, Aichi-ken (JP)

(72) Inventors: Tomokazu Yamauchi, Okazaki (JP); Koichi Nakae, Susono (JP); Ryouji Hironaka, Gamagori (JP); Kazunobu Eritate, Miyoshi (JP); Takeshi Nozaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 285 days.

(21) Appl. No.: 15/432,158

(22) Filed: Feb. 14, 2017

(65) Prior Publication Data

US 2017/0232962 A1 Aug. 17, 2017

(30) Foreign Application Priority Data

Feb. 17, 2016 (JP) ................................. 2016-028172

(51) Int. Cl.
*B60W 30/08* (2012.01)
*B60W 10/06* (2006.01)
(Continued)

(52) U.S. Cl.
CPC ............... *B60W 30/08* (2013.01); *B60K 6/22* (2013.01); *B60K 6/26* (2013.01); *B60K 6/28* (2013.01);
(Continued)

(58) Field of Classification Search
CPC ...... B60W 30/08; B60W 20/10; B60W 10/26; B60W 10/08; B60W 10/06;
(Continued)

(56) References Cited

U.S. PATENT DOCUMENTS

| 4,973,896 A * | 11/1990 | Shiga | ..................... H02J 7/1438 290/40 C |
| 2006/0232238 A1* | 10/2006 | Horii | ......................... B60K 6/28 320/104 |

(Continued)

FOREIGN PATENT DOCUMENTS

JP 2011-259517 A 12/2011

*Primary Examiner* — Jelani A Smith
*Assistant Examiner* — Majdi Alsomiri
(74) *Attorney, Agent, or Firm* — Sughrue Mion, PLLC

(57) ABSTRACT

A vehicle includes an engine, a rotating electric machine, a high-voltage power line, a high-voltage battery, an inverter, a capacitor, an electronic control unit, a low-voltage battery, an alternator, and a low-voltage power line. The capacitor is connected to the high-voltage power line. The electronic control unit is configured to control the engine such that the engine is operated and the alternator supplies electric power to the low-voltage power line in a case where the possibility of the occurrence of a collision of the vehicle is detected. The electronic control unit is configured to perform control such that the capacitor discharges a residual electric charge in a case where the possibility of the occurrence of the collision of the vehicle is detected or in a case where the occurrence of the collision of the vehicle is detected.

5 Claims, 7 Drawing Sheets

(51) Int. Cl.
| | |
|---|---|
| *B60K 6/26* | (2007.10) |
| *H02P 27/06* | (2006.01) |
| *H02P 9/08* | (2006.01) |
| *B60K 6/22* | (2007.10) |
| *B60K 6/28* | (2007.10) |
| *B60W 10/08* | (2006.01) |
| *B60W 20/10* | (2016.01) |
| *B60W 10/26* | (2006.01) |
| *B60L 3/00* | (2019.01) |
| *B60L 3/04* | (2006.01) |
| *B60L 50/16* | (2019.01) |

(52) U.S. Cl.
CPC ........... *B60L 3/0007* (2013.01); *B60L 3/0046* (2013.01); *B60L 3/04* (2013.01); *B60L 50/16* (2019.02); *B60W 10/06* (2013.01); *B60W 10/08* (2013.01); *B60W 10/26* (2013.01); *B60W 20/10* (2013.01); *H02P 9/08* (2013.01); *H02P 27/06* (2013.01); *B60K 2006/262* (2013.01); *B60W 2550/10* (2013.01); *B60W 2550/20* (2013.01); *B60W 2710/02* (2013.01); *B60W 2710/06* (2013.01); *B60W 2710/08* (2013.01); *B60W 2710/244* (2013.01); *B60Y 2200/92* (2013.01); *B60Y 2400/20* (2013.01); *Y02T 10/70* (2013.01); *Y02T 10/7077* (2013.01); *Y10S 903/907* (2013.01)

(58) Field of Classification Search
CPC ....... B60W 2710/244; B60W 2710/08; B60W 2710/02; B60W 2710/06; B60W 2550/10; B60W 2550/20; B60L 3/0046; B60L 3/0007; B60L 3/04; B60L 11/14; H02P 27/06; H02P 9/08; B60K 6/26; B60K 6/28; B60K 6/22; B60K 2006/262; B60Y 2200/92; B60Y 2400/20; Y02T 10/7077; Y02T 10/70; Y10S 903/907

See application file for complete search history.

(56) References Cited

U.S. PATENT DOCUMENTS

| | | | |
|---|---|---|---|
| 2008/0197810 A1* | 8/2008 | Ishikawa | B60L 3/0007 320/135 |
| 2009/0243554 A1* | 10/2009 | Gu | B60K 6/48 320/162 |
| 2011/0221374 A1* | 9/2011 | Maebara | H02M 7/53871 318/494 |
| 2013/0015802 A1* | 1/2013 | Hirose | B60L 3/00 318/488 |
| 2013/0049663 A1* | 2/2013 | Amano | B60L 3/0007 318/453 |
| 2013/0049665 A1* | 2/2013 | Oyobe | H02P 3/22 318/489 |
| 2015/0043111 A1* | 2/2015 | Koch | B60L 3/0007 361/54 |
| 2015/0217764 A1* | 8/2015 | Hoshiba | B60K 6/24 701/22 |

* cited by examiner

VEHICLE WITH CAPACITOR DISCHARGE CONTROL

INCORPORATION BY REFERENCE

The disclosure of Japanese Patent Application No. 2016-028172 filed on Feb. 17, 2016 including the specification, drawings and abstract is incorporated herein by reference in its entirety.

BACKGROUND

1. Technical Field

The present disclosure relates a vehicle which is travelable using power of at least one of an engine or a rotating electric machine, and specifically, to a technique for discharging a residual electric charge stored in a capacitor of the vehicle.

2. Description of Related Art

A vehicle (electric vehicle, hybrid vehicle, or the like) which is travelable using power of a rotating electric machine normally includes a high-voltage battery which stores electric power for driving the rotating electric machine, and an electric power conversion device (converter, inverter, and the like) which performs electric power conversion between the battery and the rotating electric machine. Inside the electric power conversion device, in general, a capacitor (so-called smoothing capacitor) for stabilizing a voltage is provided.

Japanese Patent Application Publication No. 2011-259517 (JP 2011-259517 A) discloses a discharge control device which executes capacitor discharge control for discharging a residual electric charge of a capacitor provided inside an electric power conversion device in a case where an electric vehicle collides against a collision object (other vehicles, obstacles, or the like). Inside the electric power conversion device, in addition to the discharge control device, a backup power supply which supplies operation electric power to the discharge control device is provided. For this reason, even in a case where a power line which supplies operation electric power from an auxiliary battery outside the electric power conversion device to the discharge control device inside the electric power conversion device is disconnected due to a collision of the vehicle, the discharge control device can execute the capacitor discharge control using the backup power supply inside the electric power conversion device.

SUMMARY

However, as disclosed in JP 2011-259517 A, providing a dedicated power supply for executing the capacitor discharge control inside the electric power conversion device results in an increase in size of the electric power conversion device with an increase in the number of parts, complication of control, or the like, and there is a concern that marketability of the vehicle is degraded.

The present disclosure provides a vehicle capable of discharging a residual electric charge of a capacitor without newly adding a dedicated power supply in a case where a collision of the vehicle occurs.

A vehicle according to an aspect of the present disclosure includes an engine, a rotating electric machine, a high-voltage power line, a high-voltage battery, an inverter, a capacitor, an electronic control unit, a low-voltage battery, an alternator, and a low-voltage power line. At least one of the engine or the rotating electric machine is configured to generate power for traveling of the vehicle. The high-voltage battery is configured to store electric power for driving the rotating electric machine. The inverter is connected to the rotating electric machine. The inverter is connected to the high-voltage battery through a high-voltage power line. The capacitor is connected to the high-voltage power line. The low-voltage battery is configured to store electric power for supplying to the electronic control unit. The alternator is configured to generate electric power using the power of the engine. The low-voltage power line connects the low-voltage battery and the alternator to the electronic control unit so as to supply electric power to the electronic control unit. The electronic control unit is configured to control the engine such that the engine is operated and the alternator supplies electric power to the low-voltage power line in a case where a possibility of an occurrence of a collision of the vehicle is detected. The electronic control unit is configured to perform control such that the capacitor discharges the residual electric charge in a case where the possibility of the occurrence of the collision of the vehicle is detected or in a case where the occurrence of the collision of the vehicle is detected.

According to the vehicle of this aspect, in a case where the possibility of the occurrence of the collision of the vehicle is detected (before the collision of the vehicle occurs), the engine is operated, and then, electric power is supplied from the alternator to the low-voltage power line. For this reason, in a case where the collision of the vehicle actually occurs, even if the low-voltage battery (auxiliary battery) is faulty due to the collision of the vehicle, it is possible to supply electric power generated by the alternator to the electronic control unit. With this, the electronic control unit can execute discharge control using electric power generated by the existing alternator. As a result, it is possible to more reliably discharge a residual electric charge of the capacitor without newly adding a dedicated power supply in a case where a collision of the vehicle occurs.

In the vehicle of the above-described aspect, the electronic control unit may be configured to control the engine such that the engine is stopped and the alternator stops a supply of electric power to the low-voltage power line in a case where the discharge of the residual electric charge of the capacitor is completed.

According to the vehicle of this aspect, it is possible to prevent the engine from being unnecessarily continuously operated after the discharge of the residual electric charge of the capacitor is completed.

The vehicle of the above-described aspect may further include a relay and a converter. The relay may be arranged in the high-voltage power line closer to the high-voltage battery side than the capacitor. The converter may be connected to the high-voltage power line closer to the inverter side than the relay and the low-voltage power line. The electronic control unit may be configured to open the relay to disconnect the high-voltage battery from the capacitor and the converter and to supply electric power from the alternator to the low-voltage power line in a case of discharging the residual electric charge of the capacitor, and the electronic control unit may be configured to supply electric power from at least one of the low-voltage battery, the alternator, or the converter to the low-voltage power line in a case of not discharging the residual electric charge of the capacitor.

According to the vehicle of this aspect, the electronic control unit opens the relay to disconnect the high-voltage battery from the capacitor and the converter and supplies electric power from the alternator to the low-voltage power line in a case of executing the discharge control. For this reason, it is possible to prevent the discharge of the capacitor from being not completed since the voltage of the high-voltage battery is applied to the capacitor during the discharge control. In addition, since electric power from the alternator is supplied to the low-voltage power line, even in a situation in which the high-voltage battery is disconnected from the converter and electric power from the converter is not supplied to the low-voltage power line, the electronic control unit can execute the discharge control with electric power supplied from the alternator. In the vehicle of the above-described aspect, the electronic control unit may be configured to control the inverter such that the capacitor discharges the residual electric charge in a case where the possibility of the occurrence of the collision of the vehicle is detected or in a case where the occurrence of the collision of the vehicle is detected. Furthermore, the vehicle of the above-described aspect may further include a clutch configured to control connection of the engine and drive wheels of the vehicle. The electronic control unit may be configured to control the clutch such that connection of the engine and the drive wheels is disconnected in a case of discharging the residual electric charge of the capacitor. In the vehicle of the above-described aspect, the electronic control unit may be configured to control the converter such that the capacitor discharges the residual electric charge in a case where the possibility of the occurrence of the collision of the vehicle is detected or in a case where the occurrence of the collision of the vehicle is detected.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
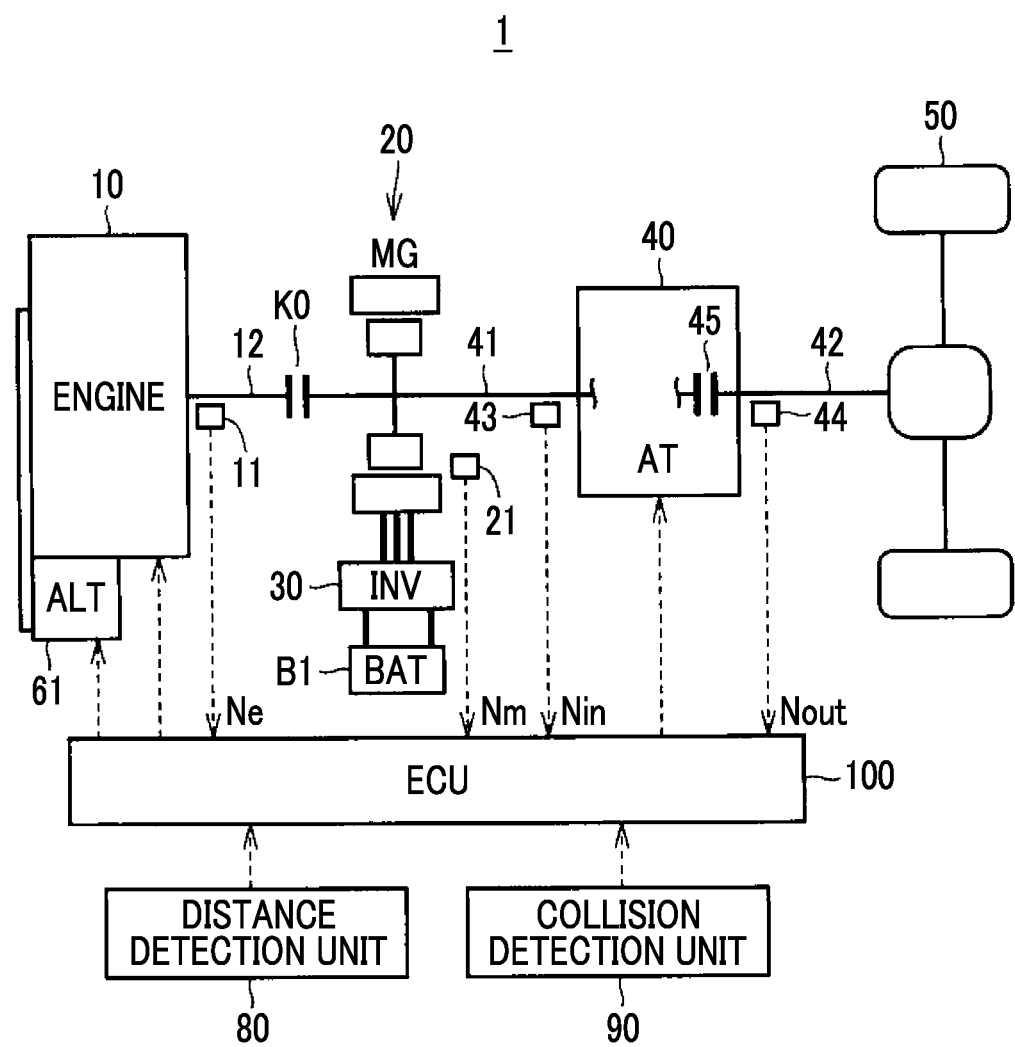
FIG. 1 is an overall configuration diagram (first view) of a vehicle.

Hereinafter, an embodiment of the present disclosure will be described in detail referring to the drawings. In the drawings, the same or similar portions are represented by the same reference numerals, and description thereof will not be repeated.

[Overall Configuration of Vehicle]

FIG. 1 is an overall configuration diagram of a vehicle 1 according to this embodiment. The vehicle 1 includes an engine 10, a clutch K0 for engine disconnection, a motor generator 20, an electric power conversion device 30, a high-voltage battery B1, an automatic transmission 40, drive wheels 50, an alternator 61, a distance detection unit 80, a collision detection unit 90, and an electronic control unit (ECU) 100.

The engine 10 is configured to generate power for traveling of the vehicle 1, and the motor generator 20 is configured to generate power for traveling of the vehicle 1. The vehicle 1 is a hybrid vehicle which travels using power of at least one of the engine 10 or the motor generator 20.

A crank shaft 12 of the engine 10 is connected to an input shaft 41 of the automatic transmission 40 through a clutch K0. A rotor of the motor generator 20 is directly coupled to the input shaft 41 of the automatic transmission 40. An output shaft 42 of the automatic transmission 40 is connected to the right and left drive wheels 50 through a differential gear.

The engine 10 is an internal combustion engine, such as a gasoline engine or a diesel engine. The motor generator 20 is driven with high-voltage electric power supplied from the high-voltage battery B1 by way of the electric power conversion device 30. The motor generator 20 is rotated with power (power transmitted from the engine 10 or the drive wheels 50) transmitted from the input shaft 41 of the automatic transmission 40 to generate electric power.

The high-voltage battery B1 stores electric power for driving the motor generator 20. An output voltage of the high-voltage battery B1 is a comparatively high voltage (for example, about several hundreds of volts). The electric power conversion device 30 performs electric power conversion between the motor generator 20 and the high-voltage battery B1.

The automatic transmission 40 is a stepped automatic transmission which is able to selectively form a plurality of gear stages in which the gear ratio (the ratio of a rotation speed of the input shaft 41 of the automatic transmission 40 to a rotation speed of the output shaft 42 of the automatic transmission 40) is different. A so-called torque converter may be provided on the input side of the automatic transmission 40.

Inside the automatic transmission 40, an internal clutch 45 is provided. The internal clutch 45 is a hydraulic frictional engagement element which is engaged or disengaged or released in response to a control signal from the ECU 100. If the internal clutch 45 is engaged, a state is brought in which power is transmitted between the input shaft 41 of the automatic transmission 40 and the output shaft 42 of the automatic transmission 40. If the internal clutch 45 is released, a state (hereinafter, referred to as a "neutral state") is brought in which power is the input shaft 41 of the automatic transmission 40 and the output shaft 42 of the automatic transmission 40 is shut down.

The alternator 61 generates electric power using the power of the engine 10, rectifies the generated electric power, and supplies electric power to a low-voltage system power line 60 (see FIG. 2 described below).

The distance detection unit 80 detects the distance from a collision object (other vehicles, obstacles, or the like) in front of the vehicle 1 and outputs a detection result to the ECU 100. The distance detection unit 80 is, for example, a radio wave radar, emits a radio wave for detecting the collision object forward of the vehicle 1, and receives a reflected wave reflected from the collision object. The distance detection unit 80 detects the distance between the vehicle 1 and the collision object based on the propagation time of the received reflected wave, a frequency difference caused by a Doppler effect, or the like. The distance detection unit 80 is not limited to a radio wave radar, and may be an ultrasonic sensor, a camera which captures an image of the collision object, or the like.

The collision detection unit 90 includes, for example, a G sensor (acceleration sensor), detects whether or not the vehicle 1 collides against the collision object from a detection result of the G sensor, and outputs a signal indicating a detection result to the ECU 100.

The vehicle 1 further includes an engine rotation speed sensor 11, a resolver 21, an input shaft rotation speed sensor 43, and an output shaft rotation speed sensor 44. The engine rotation speed sensor 11 detects a rotation speed (hereinafter, referred to as "engine rotation speed") Ne of the engine 10. The resolver 21 detects a rotation speed Nm of the motor generator 20. The input shaft rotation speed sensor 43 detects a rotation speed Nin of the input shaft 41 of the automatic transmission 40. The output shaft rotation speed sensor 44 detects a rotation speed Nout of the output shaft 42 of the automatic transmission 40. The vehicle 1 is also provided with a plurality of sensors (all of these are not shown) for detecting a physical quantity necessary for controlling the vehicle 1, such as an accelerator pedal operation amount (accelerator opening) by a user, a brake pedal operation amount (brake depression force) by the user, and a vehicle speed. These sensors transmit detection results to the ECU 100.

The ECU 100 includes a central processing unit (CPU) and a memory (not shown). The ECU 100 executes predetermined calculation processing based on information from the respective sensors and information stored in the memory and controls respective devices of the vehicle 1 based on a calculation result.

The ECU 100 makes the vehicle 1 travel in any traveling mode among a motor traveling mode, a hybrid traveling mode, and an engine traveling mode. In the motor traveling mode, the ECU 100 releases the clutch K0 and rotates the drive wheels 50 with power of the motor generator 20. In the hybrid traveling mode, the ECU 100 engages the clutch K0 and rotates the drive wheels 50 with power of both of the engine 10 and the motor generator 20. In the engine traveling mode, the ECU 100 stops the motor generator 20 in a state where the clutch K0 is engaged and rotates the drive wheels 50 with power of the engine 10.

[Configuration of Electric Circuit]

Figure 2:
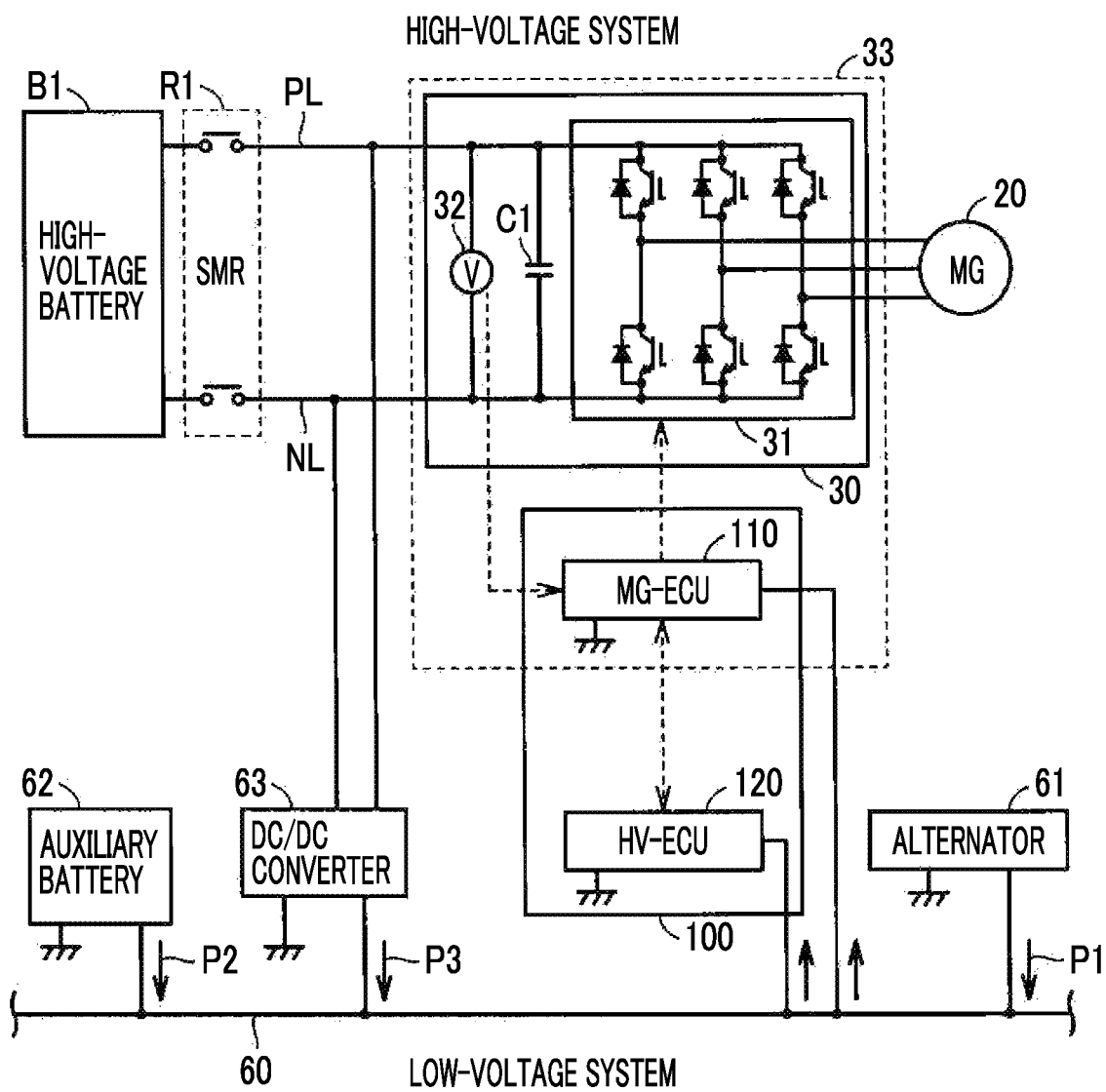
FIG. 2 is a diagram schematically showing an example of the configuration of an electric circuit of the vehicle.

FIG. 2 is a diagram schematically showing an example of the configuration of the electric circuit of the vehicle 1. The electric circuit of the vehicle 1 includes a high-voltage system in which high-voltage electric power (for example, about several hundreds of volts) for driving the motor generator 20 flows, and a low-voltage system in which low-voltage electric power (for example, about ten-odd volts) for operating accessories flows.

In the high-voltage system, the high-voltage battery B1, high-voltage system power lines (power lines for driving) PL, NL, a system main relay R1, the electric power conversion device 30, and the motor generator 20 are included.

The high-voltage system power lines PL, NL are power lines for supplying electric power from the high-voltage battery B1 to the electric power conversion device 30 (in more detail, an inverter 31 described below).

The electric power conversion device 30 includes an inverter 31, a capacitor C1, and a voltage sensor 32. The inverter 31 is connected to the motor generator 20. The inverter 31 is connected to the high-voltage battery B1 through the high-voltage system power lines PL, NL. The inverter 31 performs electric power conversion between the high-voltage battery B1 and the motor generator 20 in response to a control signal from the ECU 100 (specifically, an MG-ECU 110 described below). The inverter 31 has the circuit configuration of a so-called three-phase inverter, and includes a U-phase arm, a V-phase arm, and a W-phase arm. Each phase arm includes an upper switching element and a lower switching element connected in series, and a diode connected in reversely parallel with each switching element. An intermediate point of each phase arm is connected to the motor generator 20.

The capacitor C1 is a large-capacity high-voltage smoothing capacitor which is electrically connected between the high-voltage system power lines PL, NL. The capacitor C1 smoothes an AC component of voltage fluctuation between the power lines PL, NL. With this, a voltage between the power lines PL, NL is stabilized.

The voltage sensor 32 detects a voltage across both ends of the capacitor C1 and outputs a detection result to the ECU 100 (specifically, the MG-ECU 110 described below).

In the low-voltage system, the low-voltage system power line 60, the alternator 61, an auxiliary battery (low-voltage battery) 62, a DC/DC converter 63, and an accessory load, such as the ECU 100, are included. The low-voltage system power line 60 is a power line which is connected to the alternator 61 and the auxiliary battery 62 and supplies electric power to the accessory load, such as the ECU 100.

The alternator 61 is coupled to the crank shaft 12 of the engine 10 through a belt, generates electric power using the power of the engine 10, rectifies the generated electric power, and supplies electric power to the low-voltage system power line 60 (see an arrow P1).

The auxiliary battery 62 includes, for example, a lead storage battery and stores operation electric power of the accessory load. The auxiliary battery 62 supplies electric power stored therein to the low-voltage system power line 60 (see an arrow P2).

The system main relay R1 is provided in the high-voltage system power lines PL, NL closer to the high-voltage battery B1 side than the capacitor C1. The system main relay R1 is opened or closed in response to a control signal from the ECU 100. If the system main relay R1 is closed, the high-voltage battery B1 is connected to the electric power conversion device 30. If the system main relay R1 is opened, the high-voltage battery B1 is disconnected from the electric power conversion device 30.

The DC/DC converter 63 is electrically connected between the high-voltage system power lines PL, NL closer to the inverter 31 side than the system main relay R1 and the low-voltage system power line 60. If an operation command from the ECU 100 is received, the DC/DC converter 63 deboosts a voltage between the high-voltage system power lines PL, NL and supplies the voltage to the low-voltage system power line 60 (see an arrow P3).

The ECU 100 of this embodiment includes an MG-ECU 110 and an HV-ECU 120. The MG-ECU 110 is provided inside a housing 33 in which the electric power conversion device 30 is housed, and the HV-ECU 120 is provided outside the housing 33.

The MG-ECU 110 and the HV-ECU 120 are connected by a communication line and configured to perform two-way communication. The MG-ECU 110 monitors the rotation speed of the motor generator 20 based on the output of the resolver 21 (see FIG. 1) or the like and controls the inverter 31 in response to a command signal from the HV-ECU 120 to control the output (electrical conduction amount) of the motor generator 20. The HV-ECU 120 performs communication with the MG-ECU 110 to control the motor generator 20 and controls the engine 10 to integrally control the entire vehicle 1.

Each of the MG-ECU 110 and the HV-ECU 120 is connected to the low-voltage system power line 60 and is operated with electric power supplied from the low-voltage system power line 60. That is, the ECU 100 is operated with at least one of generated electric power (see the arrow P1) of the alternator 61, output electric power (see the arrow P2) of the auxiliary battery 62, or output electric power (see the arrow P3) of the DC/DC converter 63.

Hereinafter, in a case where there is no need for distinction between the MG-ECU 110 and the HV-ECU 120, these ECUs may be referred to as the ECU 100 without distinction therebetween.

[Capacitor Discharge Control]

As described above, the output voltage of the high-voltage battery B1 is a high voltage (for example, about several hundreds of volts). In a case where the system main relay R1 is closed and the high-voltage battery B1 and the electric power conversion device 30 are connected, the output voltage of the high-voltage battery B1 is applied to the capacitor C1 included in the electric power conversion device 30, and a high-voltage electric charge is stored in the capacitor C1. For this reason, in a case where the vehicle 1 collides against the collision object, it is desirable to quickly discharge the high-voltage residual electric charge stored in the capacitor C1.

Accordingly, the ECU 100 of this embodiment executes control (hereinafter, referred to as "capacitor discharge control") for operating the inverter 31 so as to discharge the residual electric charge of the capacitor C1 after opening the system main relay R1 to disconnect the high-voltage battery B1 from the capacitor C1 in a case where the occurrence of the collision of the vehicle 1 is detected by the collision detection unit 90.

As a specific method for the capacitor discharge control, several methods are considered. For example, as one method, a method of driving the inverter 31 such that only a d-shaft current flows in the motor generator 20 is considered. According to this method, it is possible to consume the residual electric charge of the capacitor C1 using the switching elements of the inverter 31 and a coil of the motor generator 20 without generating rotational torque in the motor generator 20. As another method, a method which maintains the switching element of one of the upper and lower arms in an arbitrary phase of the inverter 31 in an on state and switches the other switching element in a state where the motor generator 20 is not rotated is considered. Even in such a method, it is possible to consume the residual electric charge of the capacitor C1 using the switching elements of the inverter 31 and the coil of the motor generator 20.

Even in a case where any method is employed, in order to execute the capacitor discharge control, the ECU 100 needs to be operable, that is, operation electric power needs to be supplied to the ECU 100. Meanwhile, if the auxiliary battery 62 is faulty due to the collision of the vehicle 1, operation electric power is unable to be supplied from the auxiliary battery 62 to the ECU 100. At this time, while a case where operation electric power is supplied from the alternator 61 to the ECU 100 is considered, if the engine 10 is stopped at the time of the collision of the vehicle 1, since a certain time is required until the engine 10 starts and generation of electric power by the alternator 61 starts, it is not possible to quickly execute the capacitor discharge control and to quickly discharge the residual electric charge of the capacitor C1.

In this embodiment, as a supply source of operation electric power of the ECU 100, in addition to the auxiliary battery 62 and the alternator 61, the DC/DC converter 63 is provided. That is, in a case where the capacitor discharge control is not executed, electric power is supplied from at least one of the auxiliary battery 62, the alternator 61, or the DC/DC converter 63 to the low-voltage system power line 60.

Meanwhile, during the capacitor discharge control, as described above, since the system main relay R1 is opened, the high-voltage battery B1 is disconnected from the DC/DC converter 63 in addition to the capacitor C1. For this reason, during the capacitor discharge control, the DC/DC converter 63 is unable to be used as the supply source of operation electric power of the ECU 100. If the system main relay R1 is closed, since the voltage of the high-voltage battery B1 is supplied to not only the DC/DC converter 63 but also the capacitor C1, even if the capacitor discharge control is performed, it is not possible to discharge the residual electric charge of the capacitor C1. Accordingly, during the capacitor discharge control, the supply source of operation electric power of the ECU 100 is substantially limited to the auxiliary battery 62 and the alternator 61.

Newly adding a dedicated backup power supply supplying operation electric power to the ECU 100 in order to execute the capacitor discharge control, for example, inside the housing 33 of the electric power conversion device 30 is technically possible. However, adding such a backup power supply results in an increase in size of the housing 33 due to an increase in the number of parts, complication of control, or the like, and there is a concern that marketability of the vehicle 1 is degraded.

In consideration of the above-described point, the ECU 100 of this embodiment operates the engine 10 to bring the alternator 61 into an electric power generation state in advance and supplies electric power from the alternator 61 to the low-voltage system power line 60 in a case where the possibility of the occurrence of a collision of the vehicle 1 is detected by the distance detection unit 80, that is, before the collision of the vehicle 1 occurs. For this reason, in a case where the collision of the vehicle 1 occurs actually, even if the auxiliary battery 62 is faulty due to the collision of the vehicle 1, it is possible to continuously supply operation electric power from the alternator 61 to the ECU 100. For this reason, even if the auxiliary battery 62 is faulty due to the collision of the vehicle 1, the ECU 100 can quickly execute the capacitor discharge control using electric power generated by the existing alternator 61. As a result, it is possible to reliably and quickly execute the capacitor discharge control without adding a new backup power supply inside the housing 33 of the electric power conversion device 30 in a case where the collision of the vehicle 1 occurs.

Figure 3:
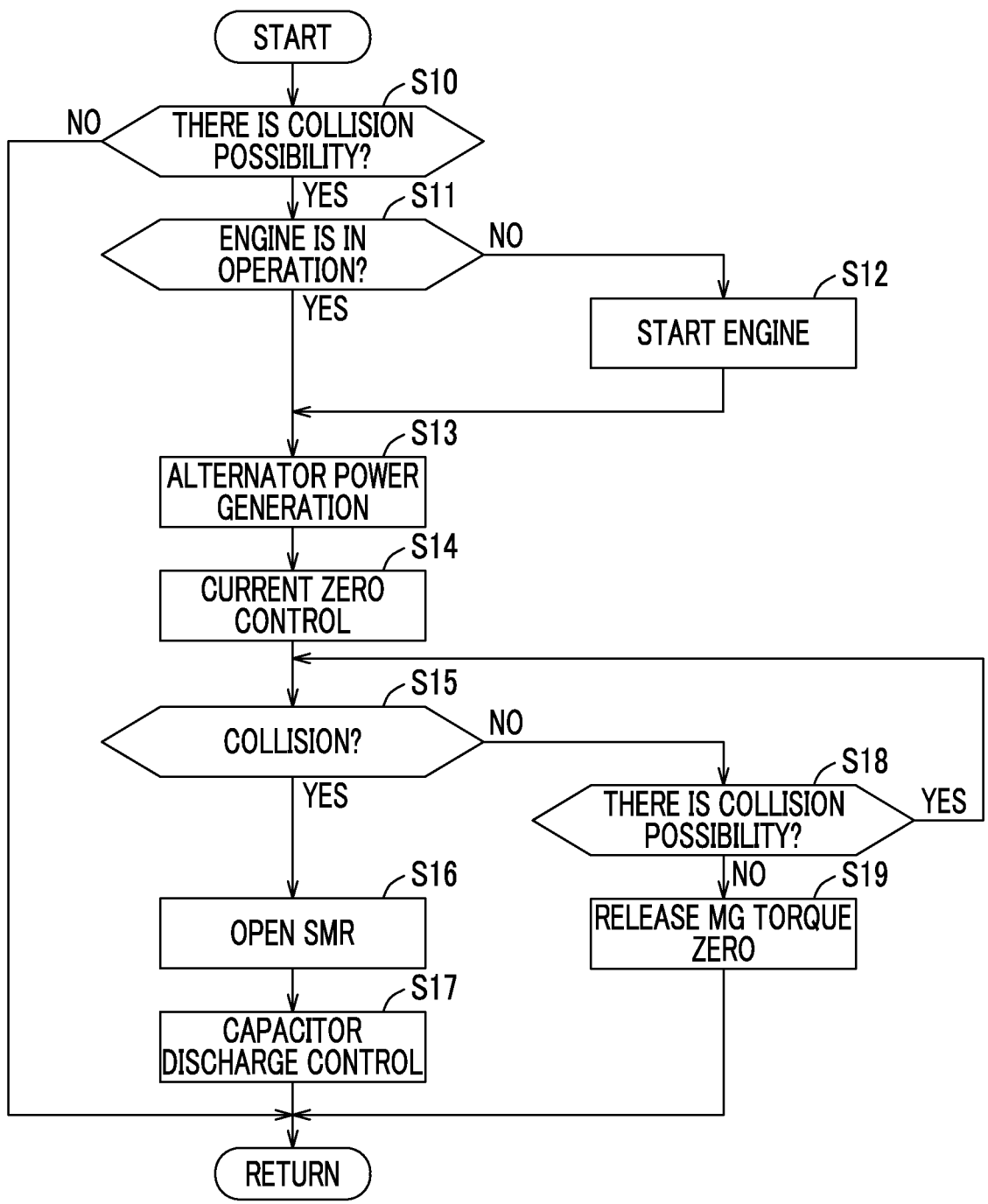
FIG. 3 is a flowchart (first view) showing a processing procedure of an ECU.

FIG. 3 is a flowchart showing a processing procedure of the ECU 100. This flowchart is repeatedly started in a predetermined period in a state where the system main relay R1 is closed (a state where an electric charge is stored in the capacitor C1).

In Step (hereinafter, Step is abbreviated as "S") 10, the ECU 100 determines whether or not the possibility of the occurrence of a collision of the vehicle 1 is detected. For example, the ECU 100 determines that the possibility of the occurrence of the collision of the vehicle 1 is detected in a case where the distance between the vehicle 1 and the collision object detected by the distance detection unit 80 is less than a predetermined value. In a case where the possibility of the occurrence of the collision of the vehicle 1 is not detected (NO in S10), the ECU 100 ends the process.

In a case where the possibility of the occurrence of the collision of the vehicle 1 is detected (YES in S10), in S11, the ECU 100 determines whether or not the engine 10 is in operation. In a case where the engine 10 is in operation (YES in S11), the ECU 100 progresses the process to S13.

In a case where the engine 10 is not in operation (NO in S11), in S12, the ECU 100 starts the engine 10. Specifically, the ECU 100 engages the clutch K0, generates torque for cranking the engine 10 from the motor generator 20, starts fuel injection and fuel ignition of the engine 10 to start the engine 10 when the engine rotation speed Ne exceeds a predetermined value due to cranking, and then, releases the clutch K0. After the engine 10 is started, the ECU 100 progresses the process to S13.

In S13, the ECU 100 brings the alternator 61 into the electric power generation state using the power of the engine 10. That is, the ECU 100 starts generation of electric power by the alternator 61 in advance before the collision of the vehicle 1 occurs.

In S14, the ECU 100 suppresses the output torque of the motor generator 20 and executes control (hereinafter, referred to as "current zero control") such that a large current does not flow between the motor generator 20 and the high-voltage battery B1.

As described below, the current zero control is effective for preventing the system main relay R1 from being welded when opening the system main relay R1 in S16.

In S15, the ECU 100 determines whether or not the occurrence of the collision of the vehicle 1 is detected by the collision detection unit 90.

In a case where the occurrence of the collision of the vehicle 1 is detected (YES in S15), in S16, the ECU 100 opens the system main relay R1 to disconnect the high-voltage battery B1 from the capacitor C1. At this time, since a state in which a large current does not flow in the system main relay R1 is brought by the current zero control started in S14 described above, the system main relay R1 is prevented from being welded due to a large current intensively flowing in a specific part when opening the system main relay R1.

Thereafter, in S17, the ECU 100 executes the above-described capacitor discharge control. That is, the ECU 100 operates the inverter 31 to discharge the residual electric charge of the capacitor C1. At this time, since the engine 10 is operated and generation of electric power by the alternator 61 is performed in advance through S11 to S13 described above, even if the auxiliary battery 62 is fault due to the collision of the vehicle 1, the ECU 100 can execute the capacitor discharge control with electric power supplied from the alternator 61.

When executing the capacitor discharge control, at least one of the clutch K0 or the internal clutch 45 may be released to disconnect the engine 10 from the drive wheels 50. When this happens, even after the vehicle 1 is completely stopped due to the collision of the vehicle 1, it is possible to more reliably continue the operation (generation of electric power by the alternator 61) of the engine 10.

In a case where the occurrence of the collision of the vehicle 1 is not detected (NO in S15), in S18, the ECU 100 determines whether or not the possibility of the occurrence of the collision of the vehicle 1 is continuously detected. In a case where the possibility of the occurrence of the collision of the vehicle 1 is continuously detected (YES in S18), the ECU 100 returns the process to S15.

In a case where the possibility of the occurrence of the collision of the vehicle 1 is not detected (NO in S18), in S19, the ECU 100 releases the current zero control started in S14. With this, a normal state is returned, and the output torque of the motor generator 20 is adjusted so as to satisfy a user's request.

As described above, the ECU 100 of this embodiment operates the engine 10 to bring the alternator 61 into the electric power generation state and supplies electric power from the alternator 61 to the low-voltage system power line 60 in a case where the possibility of the occurrence of the collision of the vehicle 1 is detected (before the collision of the vehicle occurs). For this reason, in a case where the collision of the vehicle 1 occurs actually, even if the auxiliary battery 62 is faulty due to the collision of the vehicle 1, electric power generated by the alternator 61 is continuously supplied to the ECU 100. For this reason, the ECU 100 can quickly execute the capacitor discharge control using electric power generated by the existing alternator 61. As a result, it is possible to reliably and quickly execute the capacitor discharge control without newly adding a dedicated backup power supply in a case where the collision of the vehicle 1 occurs.

The ECU 100 of this embodiment opens the system main relay R1 to disconnect the high-voltage battery B1 from the capacitor C1 and the DC/DC converter 63 in a case of executing the capacitor discharge control. For this reason, it is possible to prevent the discharge of the capacitor C1 from being not completed since the voltage of the high-voltage battery B1 is applied to the capacitor C1 during the capacitor discharge control. At this time, as described above, since electric power from the alternator 61 is supplied to the low-voltage system power line 60, even in a situation in which the high-voltage battery B1 is disconnected from the DC/DC converter 63 and electric power from the DC/DC converter 63 is not supplied to the low-voltage system power line 60, the ECU 100 can execute the capacitor discharge control with electric power supplied from the alternator 61.

Modification Example 1

In the foregoing embodiment, in a case where the possibility of the occurrence of the collision of the vehicle 1 is detected, the engine 10 is maintained in the operation state in order to secure operation electric power of the ECU 100. Meanwhile, in a case where the discharge of the residual electric charge of the capacitor C1 is completed by the capacitor discharge control, the engine 10 does not need to be operated.

Accordingly, in this modification example, in a case where the discharge of the residual electric charge of the capacitor C1 is completed by the capacitor discharge control, the engine 10 is stopped to stop the supply of electric power from the alternator 61 to the low-voltage system power line 60.

Figure 4:
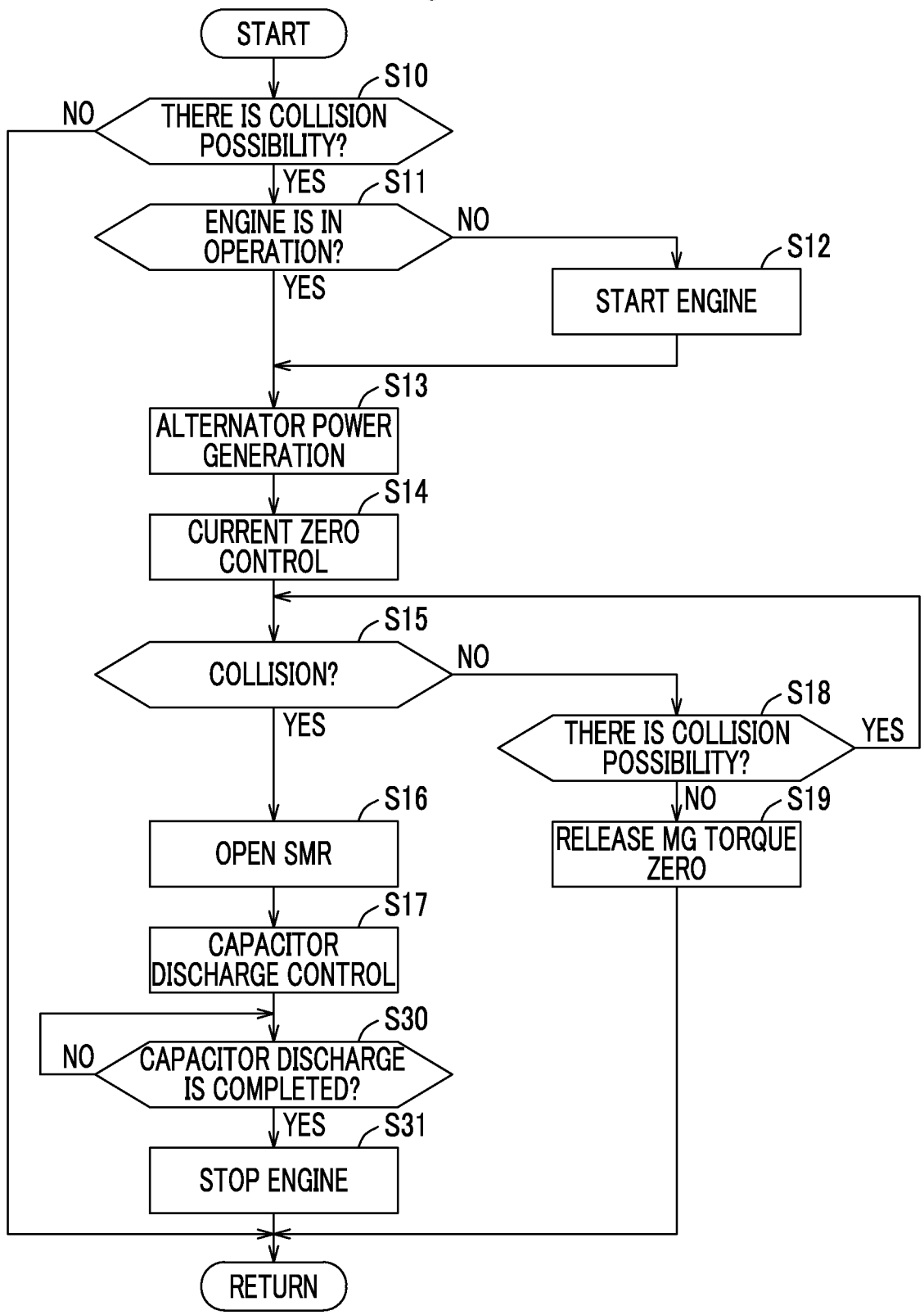
FIG. 4 is a flowchart (second view) showing the processing procedure of the ECU.

FIG. 4 is a flowchart showing a processing procedure of the ECU 100 according to this modification example. In the flowchart shown in FIGS. 4, S30 and S31 are added after S17 of FIG. 3 described above. Other kinds of processing are represented by the same reference numerals as the steps shown in FIG. 3 and have been already described, and thus, detailed description thereof will not be repeated.

After the capacitor discharge control is executed in S17, in S30, the ECU 100 determines whether or not the discharge of the capacitor C1 is completed. For example, the ECU 100 determines that the discharge of the residual electric charge of the capacitor C1 is completed in at least one of a case where the voltage across both ends of the capacitor C1 detected by the voltage sensor 32 is less than a predetermined value or a case where an elapsed time from the start of the capacitor discharge control exceeds a predetermined time.

In a case where the discharge of the capacitor C1 is not completed (NO in S30), the ECU 100 returns the process to S30 and waits until the discharge of the capacitor C1 is completed.

In a case where the discharge of the capacitor C1 is completed (YES in S30), in S31, the ECU 100 stops the engine 10.

In this way, the ECU 100 of this modification example stops the engine 10 in a case where the discharge of the residual electric charge of the capacitor C1 is completed by the capacitor discharge control. For this reason, it is possible to prevent the engine 10 from being unnecessarily operated even though the discharge of the residual electric charge of the capacitor C1 is completed.

Modification Example 2

In the foregoing embodiment, the capacitor discharge control is started after the collision of the vehicle 1. However, in order to quickly complete the discharge of the residual electric charge of the capacitor C1 after the collision of the vehicle 1, it is desirable to start the capacitor discharge control from a stage in which the possibility of the occurrence of the collision of the vehicle 1 is detected (before the collision of the vehicle 1 occurs).

Meanwhile, in a stage in which the possibility of the occurrence of the collision of the vehicle 1 is detected, it is assumed that the vehicle 1 is traveling and the motor generator 20 is rotating. In such a stage, if the system main relay R1 is opened and the electric charge of the capacitor C1 is consumed by the motor generator 20 through the capacitor discharge control, there is a concern that the motor generator 20 being rotated generates deceleration torque and the generated deceleration torque is transmitted to the drive wheels 50 by way of the automatic transmission 40 and affects the behavior of the vehicle 1.

If the clutch K0 is still engaged during the execution of the capacitor discharge control (during the operation of the engine 10), since the motor generator 20 is rotated with the power of the engine 10 to generate electric power, and the electric power is supplied to the capacitor C1, there is a concern that the discharge of the capacitor C1 is not completed.

In consideration of these points, in this modification example, in a case where the possibility of the occurrence of the collision of the vehicle 1 is detected, the capacitor discharge control is started after the clutch K0 is released and the internal clutch 45 is released.

Figure 5:
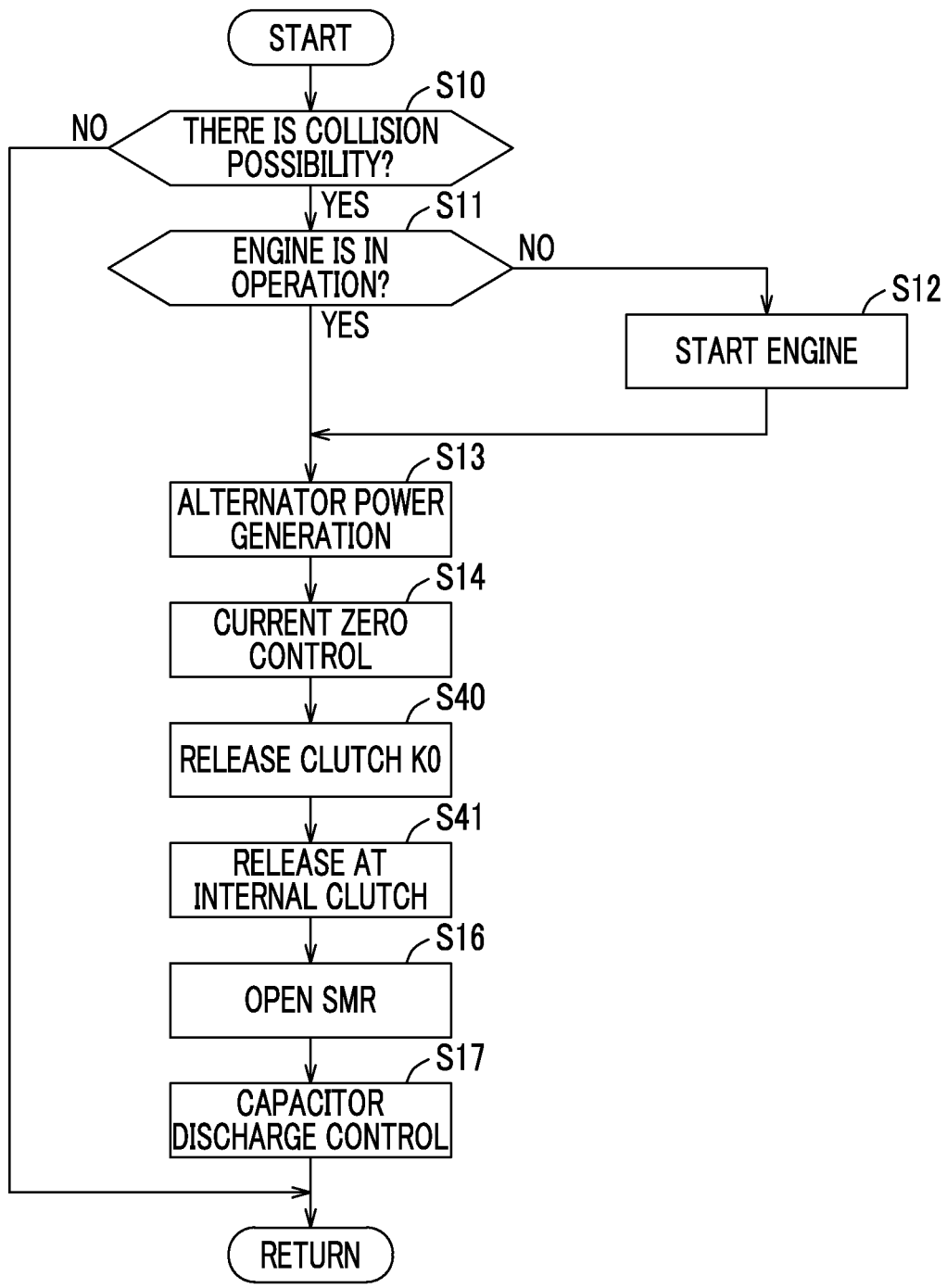
FIG. 5 is a flowchart (third view) showing the processing procedure of the ECU.

FIG. 5 is a flowchart showing a processing procedure of the ECU 100 according to this modification example. Out of the steps shown in FIG. 5, the steps represented by the same reference numerals as the steps shown in FIG. 3 described below have been already described, and thus, detailed description thereof will not be repeated.

After the processing of S14, in S40, the ECU 100 releases the clutch K0. In a case where the clutch K0 is already released after the engine 10 is started in S12 or the like, the ECU 100 maintains the clutch K0 in a release state.

In S41, the ECU 100 releases the internal clutch 45. In a case where the internal clutch 45 is already released, the ECU 100 maintains the internal clutch 45 in the release state. Thereafter, the ECU 100 opens the system main relay R1 in S16 and starts the capacitor discharge control in S17.

In this way, the ECU 100 of this modification example starts the capacitor discharge control after releasing the clutch K0 and releasing the internal clutch 45 in a case where the possibility of the occurrence of the collision of the vehicle 1 is detected. Even if the deceleration torque of the motor generator 20 is generated by the capacitor discharge control, since the internal clutch 45 is released, the deceleration torque of the motor generator 20 is not transmitted to the drive wheels 50 and does not affect the behavior of the vehicle 1.

Even if the engine 10 is operated for generation of electric power by the alternator 61, since the clutch K0 is released, the power of the engine 10 is not transmitted to the motor generator 20. For this reason, it is possible to stop the motor generator 20 to quickly complete the discharge of the capacitor C1 while operating the engine 10 to perform generation of electric power by the alternator 61.

Since the clutch K0 is released and the internal clutch 45 is released to disconnect the engine 10 from the drive wheels 50, even after the vehicle 1 is completely stopped due to the collision of the vehicle 1, it is possible to more reliably continue the operation (generation of electric power by the alternator 61) of the engine 10.

Modification Example 3

In the foregoing embodiment, the rotor of the motor generator 20 is directly coupled to the input shaft 41 of the automatic transmission 40. However, the rotor of the motor generator 20 may be connected to the input shaft 41 of the automatic transmission 40 through a clutch.

Figure 6:
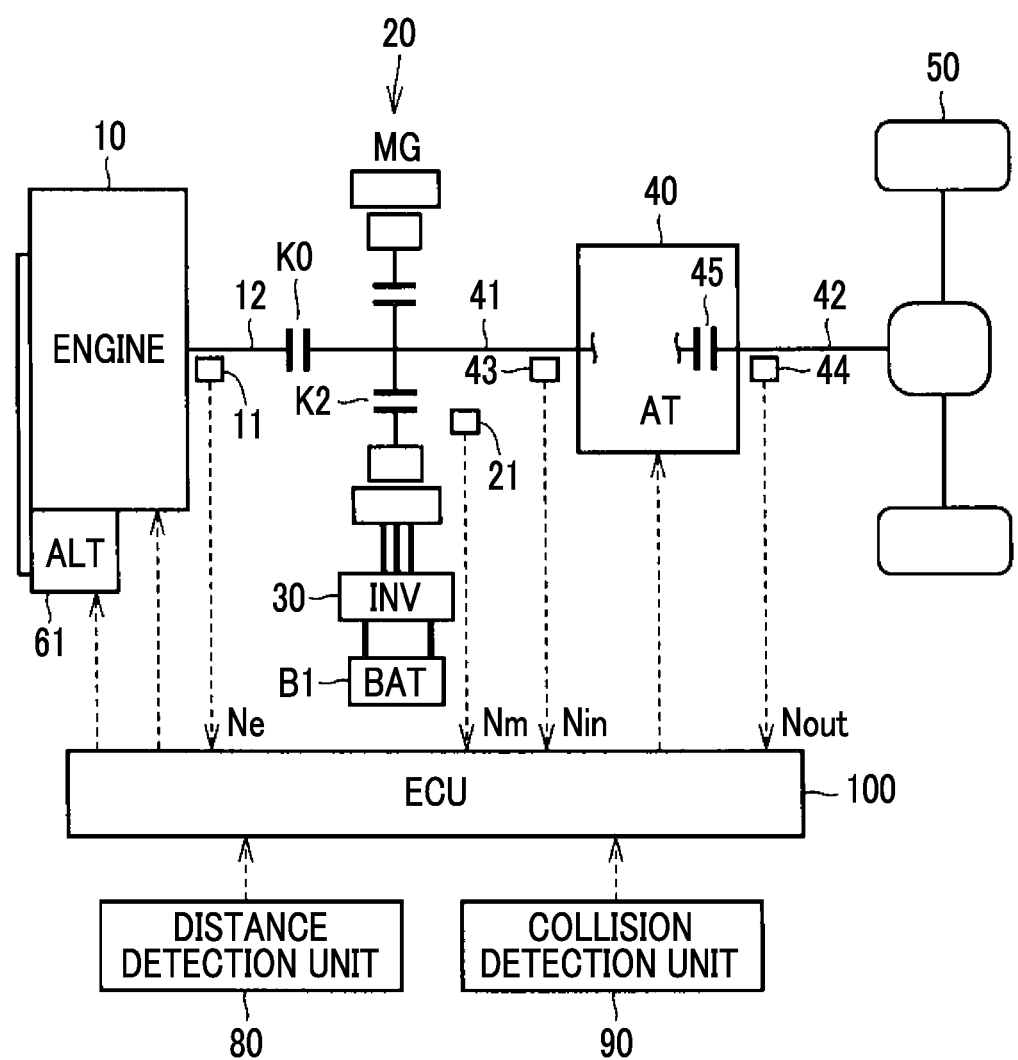
FIG. 6 is an overall configuration diagram (second view) of the vehicle.

FIG. 6 is an overall configuration diagram of a vehicle 1A according to this modification example. In this vehicle 1A, a clutch K2 for disconnection of the motor generator 20 is provided between the rotor of the motor generator 20 and the input shaft 41 of the automatic transmission 40. That is, the rotor of the motor generator 20 is connected to the input shaft 41 of the automatic transmission 40 through the clutch K2. Other structures of the vehicle 1A are the same as those of the vehicle 1 according to the foregoing embodiment, and thus, detailed description thereof will not be repeated.

In the vehicle 1A having the configuration described above, even in a state where the clutch K0 is engaged and the vehicle 1A is traveling (a state where the engine 10 and the input shaft 41 of the automatic transmission 40 are rotating), the clutch K2 is released, whereby it is possible to stop the rotation of the motor generator 20. Accordingly, the ECU 100 of this modification example starts the capacitor discharge control after releasing the clutch K2 in a case where there is the possibility that the collision of the vehicle 1 occurs.

Figure 7:
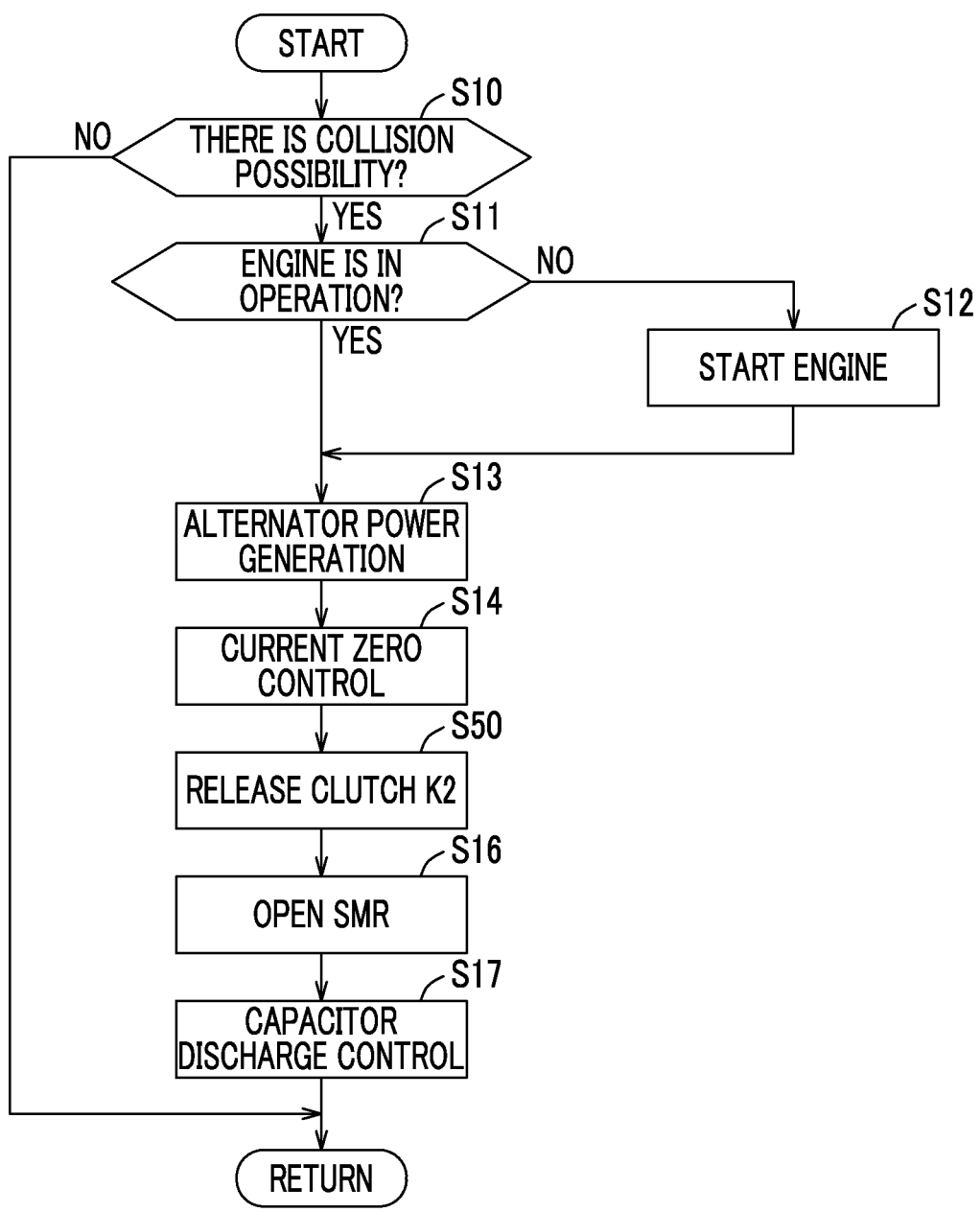
FIG. 7 is a flowchart (fourth view) showing the processing procedure of the ECU.

FIG. 7 is a flowchart showing a processing procedure of the ECU 100 according to this modification example. In the flowchart shown in FIG. 7, the processing of S40 and S41 of FIG. 5 described above is changed to the processing of S50. Other kinds of processing are represented by the same reference numerals as the steps shown in FIG. 5 described above and have been already described, and thus, detailed description thereof will not be repeated.

After the processing of S14, in S30, the ECU 100 releases the clutch K2. Thereafter, the ECU 100 opens the system main relay R1 in S16, and starts the capacitor discharge control in S17.

In this way, the ECU 100 of this modification example starts the capacitor discharge control after releasing the clutch K2 in a case where there is the possibility that the collision of the vehicle 1 occurs. For this reason, even in a state where the clutch K0 is engaged and the vehicle 1A is traveling (a state where the engine 10 and the input shaft 41 of the automatic transmission 40 are rotating), it is possible to stop the rotation of the motor generator 20 to quickly complete the discharge of the capacitor C1 by the capacitor discharge control.

Other Modification Examples

Although a converter is not included in the electric power conversion device 30 according to the foregoing embodiment, a converter which performs voltage conversion between the high-voltage battery B1 and the inverter 31 may be added to the electric power conversion device 30. In a case where the converter is added, the converter may be an object of capacitor discharge control. That is, the converter may be operated so as to discharge the residual electric charge of the capacitor.

An object of capacitor discharge control is not necessarily limited to the inverter 31 or the above-described converter. For example, a dedicated circuit for discharging the residual electric charge of the capacitor may be provided, and the dedicated circuit may be an object of capacitor discharge control.

Even in a case where a certain device is an object of capacitor discharge control, since an object of capacitor discharge control is controlled by the ECU 100, operation electric power needs to be supplied to the ECU 100 in order to execute the capacitor discharge control. For this reason, the present disclosure is effectively applied.

A hybrid vehicle to which the present disclosure is applicable may be a hybrid vehicle including an alternator which generates operation electric power of the ECU 100 with the power of the engine, and is not limited to the hybrid vehicles shown in FIGS. 1 and 6 described above. For example, although the hybrid vehicles shown in FIGS. 1 and 6 include one motor generator 20, the present disclosure is applicable to a hybrid vehicle including two or more motor generators.

In the foregoing embodiment, although the ECU 100 is divided into two units of the MG-ECU 110 and the HV-ECU 120, The ECU 100 may be divided into three or more units, or may be integrated into one unit. As shown in FIG. 2, although the MG-ECU 110 is provided inside the housing 33, the MG-ECU 110 may be provided outside the housing 33.

The above-described embodiment and the modification examples thereof may be combined as appropriate as long as the combination does not give rise to technical inconsistency.

It should be considered that the embodiments disclosed herein are merely exemplary in all aspects, and not restrictive. The scope of the present disclosure is defined by the appended claims, not the above description, and is intended to include all changes or modifications within the range of the claims and equivalents thereof.

What is claimed is:

1. A vehicle comprising:
an engine;
a rotating electric machine;
a high-voltage battery configured to store electric power for driving the rotating electric machine;
a high-voltage power line;
an inverter connected to the rotating electric machine, the inverter being connected to the high-voltage battery through the high-voltage power line;
a capacitor connected to the high-voltage power line;
an electronic control unit;
a low-voltage battery configured to store electric power for supplying to the electronic control unit;
an alternator configured to generate electric power using the power of the engine; and
a low-voltage power line connecting the low-voltage battery and the alternator to the electronic control unit so as to supply electric power to the electronic control unit,
wherein at least one of the engine or the rotating electric machine is configured to generate power for traveling the vehicle,
the electronic control unit is configured to control the engine such that the engine is operated and the alternator supplies electric power to the low-voltage power line in response to a possibility of an occurrence of a collision of the vehicle being detected,
the electronic control unit is configured to perform control such that the capacitor discharges a residual electric charge in response to the possibility of the occurrence of the collision of the vehicle being detected or in response to the occurrence of the collision of the vehicle being detected, and
the electronic control unit is configured to control the engine such that the engine is stopped and the alternator stops a supply of electric power to the low-voltage power line when the discharge of the residual electric charge of the capacitor is completed.

2. The vehicle according to claim 1, wherein the electronic control unit is configured to control the inverter such that the capacitor discharges the residual electric charge in response to the possibility of the occurrence of the collision of the vehicle being detected or in response to the occurrence of the collision of the vehicle being detected.

3. The vehicle according to claim 2, further comprising:
a clutch configured to control connection of the engine and drive wheels of the vehicle, wherein the electronic control unit is configured to control the clutch such that connection of the engine and the drive wheels is disconnected when discharging the residual electric charge of the capacitor.

4. A vehicle comprising:
an engine;
a rotating electric machine;
a high-voltage battery configured to store electric power for driving the rotating electric machine;
a high-voltage power line;
an inverter connected to the rotating electric machine, the inverter being connected to the high-voltage battery through the high-voltage power line;
a capacitor connected to the high-voltage power line;
an electronic control unit;
a low-voltage battery configured to store electric power for supplying to the electronic control unit;
an alternator configured to generate electric power using the power of the engine; and
a low-voltage power line connecting the low-voltage battery and the alternator to the electronic control unit so as to supply electric power to the electronic control unit, wherein at least one of the engine or the rotating electric machine is configured to generate power for traveling the vehicle,
the electronic control unit is configured to control the engine such that the engine is operated and the alternator supplies electric power to the low-voltage power line in response to a possibility of an occurrence of a collision of the vehicle being detected,
the electronic control unit is configured to perform control such that the capacitor discharges a residual electric charge in response to the possibility of the occurrence of the collision of the vehicle being detected or in response to the occurrence of the collision of the vehicle being detected, the vehicle further comprises:

a relay arranged in the high-voltage power line closer to the high-voltage battery side than the capacitor; and a converter connected to the high-voltage power line closer to the inverter side than the relay and the low-voltage power line, and wherein the electronic control unit is configured to open the relay to disconnect the high-voltage battery from the capacitor and the converter and to supply electric power from the alternator to the low-voltage power line when discharging the residual electric charge of the capacitor, and the electronic control unit is configured to supply electric power from at least one of the low-voltage battery, the alternator, or the converter to the low-voltage power line when the residual electric charge of the capacitor is not discharging.

5. The vehicle according to claim 4, wherein the electronic control unit is configured to control the converter such that the capacitor discharges the residual electric charge in response to the possibility of the occurrence of the collision of the vehicle being detected or in response to the occurrence of the collision of the vehicle being detected.

* * * * *